Patented Mar. 20, 1923.

1,449,127

UNITED STATES PATENT OFFICE.

MARTIN NILSSON AND NORMAN S. HARRISON, OF PEEKSKILL, NEW YORK, ASSIGNORS TO THE FLEISCHMANN COMPANY, OF NEW YORK, N. Y., A CORPORATION OF OHIO.

PROCESS FOR PRODUCING YEAST.

No Drawing.   Application filed January 7, 1919. Serial No. 270,083.

*To all whom it may concern:*

Be it known that we, MARTIN NILSSON, a citizen of the United States, and NORMAN S. HARRISON, a subject of Great Britain, residing, respectively, in Peekskill, county of Westchester, and State of New York, have invented new and useful Improvements in Processes for Producing Yeast, of which the following is a full, clear, and exact specification.

Our invention relates to processes for the production of yeast and refers particularly to a process for the production of bakers' yeast from sacchariferous materials, such as molasses.

The object of our invention is the provision of a process for producing yeast with relatively high yields by growing it from seed yeast in a sacchariferous nutrient solution treated with yeast nutrient compounds, such solution being adapted for use in the art of yeast manufacture instead of cereal worts.

The usual procedure heretofore practiced in the production of yeast involved mashing malted cereals with water at certain temperatures in order to obtain a maximum amount of carbohydrates, proteins and mineral matters in solution. The resulting mash or wort was then filtered and the liquid stocked with yeast, after which it was aerated to promote the growth of yeast. The yeast thus produced was separated from the liquid by some suitable means. The process involving this procedure, however, is a comparatively expensive one as it requires a considerable amount of coal, labor and time incident to its proper practice, while the delicacy of the various operations requires careful and expert attention.

The process of our invention avoids these difficulties and presents a simplified procedure whereby a superior grade of yeast can be produced more economically, with greater certainty of results, and with increased yields.

In the practice of the process of this invention, yeast is propagated in a sacchariferous nutrient solution to which has been added compounds containing phosphorus, and nitrogen in yeast assimilable form, the propagation of yeast being allowed to proceed to the fullest desired extent, dependent upon the quality of yeast to be produced.

The compounds containing phosphorus intended to be included in the practice of this invention are those of an inorganic character adapted to yield at least a portion of their phosphorus content during the period of yeast propagation, as, for example, phosphorous acid; phosphoric acid; phosphate of ammonium; phosphates of alkali metals, such as sodium phosphate, or potassium phosphate; and phosphates of alkali earths, as calcium acid-phosphate, or magnesium acid-phosphate.

The compounds containing nitrogen are intended to include those which are adapted to supply inorganic nitrogen in yeast assimilable form; those preferably employed are ammoniacal compounds, as, for example, aqua-ammonia (ammonium hydroxide) and salts of ammonium.

Certain alkaline compounds in this process, however, are the equivalent of aqua-ammonia when used with the addition of a suitable nitrogenous compound, as, for example, sodium hydrate, to which has been added ammonium phosphate. In the use of ammonium salts it is preferable always to add an alkali, as, for example, a carbonate or a hydrate, in order that free hydroxyl ions may be supplied while neutralizing the deleterious acidity developed during the period of yeast propagation. The second mentioned class of compounds would therefore include alkaline compounds when used in this manner.

The sacchariferous material employed in making the nutrient solution is of a character adapted to be subject to fermentation under the conditions of yeast propagation; among those which it is contemplated using are beet molasses and cane molasses.

Particularly valuable results are obtained by the use of beet molasses with the addition of a phosphate, such as ammonium phosphate, and ammonia; the yeast which is produced has great strength and improved lasting qualities, the cost of propagation being much less than that incident to the production of yeast by the processes heretofore generally employed.

Some yeasts, as is well known, are of such character that when exposed in masses for a short time tend to break down; when this is extreme they tend to pass into a slimy condition. By our process, however, a product is obtained which does not become slimy or deteriorate with age, and has therefore what has been above referred to as lasting qualities, such qualities insuring that a mass of yeast will sustain its strong condition for a long period, the fermenting power also being retained.

In practicing the process of our invention, consideration of the results obtained appears to indicate that molasses is rich in practically all the materials necessary for yeast nourishment during the period of yeast propagation, with the exception of materials from which yeast assimilable nitrogen and phosphorus may be obtained while yeast is being propagated. Such constituents are of the greatest economical and commercial value in the manufacture of yeast since they allow the production of increased yields of a superior quality of yeast at a cost considerably below that grown from cereal worts. The sacchariferous material here employed is, however, deficient in these constituents, which deficiency is compensated for by the added compounds.

We have found that while yeast may be produced from cane molasses by our process, it is preferable to use beet molasses, as the yeast obtained from it is stronger, whiter, purer, more lasting, more easily manufactured and even less expensive that that produced from cane molasses.

By the process of this invention yeast can be propagated in a nutrient solution containing molasses, whether it be acid or alkaline, during the period of yeast growth, but we prefer that the condition of the nutrient solution be that of approximate neutrality since this condition appears to be conducive to maximum yeast production, though it is known that yeast multiplication is carried on most thoroughly when the nutrient solution is slightly acid. The acidity of the solution, however, if allowed to rise, will soon reach a point where the multiplication of yeast cells is deleteriously effected. On the other hand, if the solution is too strongly akaline there will be a cessation of yeast development, though not necessarily a cessation of the production of alcohol, it being known that the production of alcohol is dependent upon the presence of zymase and is therefore not directly commensurate with yeast multiplication.

The acidity which develops while yeast is multiplying is additive to the slight initial acidity preferably maintained for economic yeast culture, such acidity being produced by the partial assimilation of the salts in solution during the process of yeast propagation, which results in releasing acid radicals or components, as, for example, the partial assimilation of ammonium phosphate by yeast results in releasing the radical of phosphoric acid. It is for the purpose of rebinding the acid radicals thus released so as to restore the original conditions approximating neutrality as far as possible that compounds adapted to supply hydroxyl ions are added to the nutrient solution.

The following is an example of the process of our invention:—

560 pounds of practically neutral beet-molasses are diluted with 950 gallons of water and a solution of 14 pounds of phosphate of ammonium is gradually added. 11.2 pounds of yeast are then introduced. Air is blown into the mixture until the production of yeast is ended, the mixture being maintained in a practically neutral condition by the addition of ammonia from time to time to accomplish this result. The mixture is maintained at a temperature of 25°–30° C. during the operation which usually occupies about 24 hours. The yeast is then separated from the remainder of the mixture in any suitable manner. The process produces from 50%–60% of an extremely strong yeast which is not nearly as subject to deterioration as is the yeast produced in the ordinary way.

While the example given employs only one phosphorus-containing compound, a mixture of several phosphorus containing compounds may be used as a mixture of phosphate of ammonium and acid-phosphate of calcium.

We do not limit ourselves to the particular compounds, quantities, temperatures, duration of reaction or mode of procedure described, all of which may be varied without going beyond the scope of our invention as described and claimed.

Having described our invention, what we claim as new and desire to secure by Letters Patent is:

1. A process of producing yeast, which comprises preparing a yeast nutrient solution, propagating yeast therein with aeration, said yeast nutrient solution containing only molasses and inorganic compounds containing phosphorus and nitrogen, which are adapted to yield at least a portion of their content to the yeast and to set free components which tend increasingly to acidify the solution during propagation, and during the period of propagation neutralizing the excess of such acidity.

2. A process of producing yeast, which comprises preparing a yeast nutrient solution, propagating yeast therein with aeration, said yeast nutrient solution containing only molasses and phosphate of ammonium adapted to be at least partially assimilated by the yeast and to set free components which tend increasingly to acidify the solution during propagation, and during the period of propagation neutralizing the excess of such acidity.

3. A process of producing yeast, which comprises preparing a yeast nutrient solution, propagating yeast therein with aeration, said yeast nutrient solution containing essentially molasses and inorganic compounds containing phosphorus and adapted to yield at least a portion of their content to the yeast and to set free components which tend increasingly to acidify the solution during propagation, and introducing into the solution during the period of propagation a compound, containing inorganic nitrogen in yeast assimilable form and having an alkaline reaction, in quantities adapted to neutralize the excess of such acidity.

4. A process of producing yeast, which comprises preparing a yeast nutrient solution, propagating yeast therein with aeration, said nutrient solution containing essentially molasses and phosphate of ammonium adapted to be at least partially assimilated by the yeast and to set free components which tend increasingly to acidify the nutrient solution during propagation, and introducing into the solution during the period of propagation a compound, containing inorganic nitrogen in yeast assimilable form and having an alkaline reaction, in quantities adapted to neutralize the excess of such acidity.

5. A process of producing yeast which comprises preparing a yeast nutrient solution, propagating yeast therein with aeration, said yeast nutrient solution containing essentially beet molasses and inorganic compounds containing phosphorus and adapted to yield at least a portion of their content to the yeast and to release components which tend increasingly to acidify the nutrient solution during propagation, and introducing into the nutrient solution an ammoniacal compound, adapted to supply inorganic nitrogen in yeast assimilable form and having an alkaline reaction, in amounts sufficient to neutralize the excess of such acidity.

6. A process of producing yeast which comprises preparing a yeast nutrient solution, propagating yeast therein with aeration, said yeast nutrient solution containing essentially beet molasses and phosphate of ammonium adapted to yield at least a portion of its content to the yeast and to release components which tend increasingly to acidify the nutrient solution during propagation, and introducing into the nutrient solution during the period of propagation aqua-ammonia in amounts sufficient to neutralize the excess of such acidity.

7. In the art of yeast manufacture, the process which comprises preparing in a fermentor a yeast nutrient solution containing essentially beet molasses and inorganic compounds adapted to supply phosphorus and nitrogen and to release components which tend increasingly to acidify the solution during propagation, seeding the solution with yeast, effecting propagation with aeration while maintaining the temperature between the limits of 25° to 30° C., and during the period of propagation neutralizing the excess of such acidity by the addition of an ammoniacal compound having an alkaline reaction.

8. In the art of manufacturing bakers' yeast, the process which comprises preparing a yeast nutrient solution in a fermentor with beet molasses and phosphate of ammonium adapted to supply at least a portion of its content and to release components which tend increasingly to acidify the solution during propagation, introducing seed yeast, effecting propagation with aeration at a temperature between the limits of 25° to 30° C., introducing into the fermentor aqua-ammonia in such quantities as to neutralize substantially the excess of said acidity, and thereafter separating the yeast.

9. A process of producing yeast, which comprises preparing a yeast nutrient solution, propagating yeast therein with aeration, said yeast nutrient solution containing only molasses and an inorganic compound containing phosphorus and nitrogen, which is adapted to yield at least a portion of its content to the yeast and to set free components which tend increasingly to acidify the solution during propagation, and during the period of propagation neutralizing the excess of such acidity.

10. A process of producing yeast, which comprises preparing a yeast nutrient solution, propagating yeast therein with aeration, said yeast nutrient solution containing essentially molasses and an inorganic compound containing phosphorus and adapted to yield at least a portion of its content to the yeast and to set free components which tend increasingly to acidify the solution during propagation, and introducing into the solution during the period of propagation a compound, containing inorganic nitrogen in yeast assimilable form and having an alkaline reaction, in quantities adapted to neutralize the excess of such acidity.

11. A process of producing yeast which comprises preparing a yeast nutrient solution, propagating yeast therein with aeration, said yeast nutrient solution containing essentially beet molasses and an inorganic compound containing phosphorus and adapted to yield at least a portion of its content to the yeast and to release components which tend increasingly to acidify the nutrient solution during propagation and introducing into the nutrient solution an ammoniacal compound, adapted to supply inorganic nitrogen in yeast assimilable form and having an alkaline reaction, in amounts sufficient to neutralize the excess of such acidity.

12. In the art of manufacturing bakers' yeast a step which comprises preparing a yeast nutrient solution, adapted for large commercial yields of yeast, consisting essentially of water, molasses and an inorganic compound containing phosphorus and nitrogen in yeast assimilable form, in amounts sufficient to supply all essential yeast nutrients during the propagating period.

13. In the art of manufacturing bakers' yeast the step which comprises preparing a yeast nutrient solution, adapted for large commercial yields of yeast, consisting of essentially water, molasses and an admixture of yeast nourishing inorganic compounds containing prosphorus and nitrogen in yeast assimilable form, in amounts sufficient to supply all essential yeast nutrients during the propagating period.

14. In the art of manufacturing bakers' yeast the step which comprises preparing a yeast nutrient solution, adapted for large commercial yields of yeast, consisting of essentially water, beet molasses and ammonium phosphate, in amounts sufficient to supply all essential yeast nutrients during the propagating period.

Signed at New York city, in the county of New York and State of New York, this 3rd day of January, 1919.

MARTIN NILSSON.
NORMAN S. HARRISON.